United States Patent
Sejourne (10) Patent No.: US 6,527,452 B1
(45) Date of Patent: Mar. 4, 2003

(54) DEVICE FOR INTERCONNECTING TWO OPTICAL FIBERS WITH AXIAL RETENTION MEANS AND AN UNLOCKING KEY

(75) Inventor: Damien Sejourne, Tournan (FR)

(73) Assignee: Proptic, Rosny sous Bois (FR)

( * ) Notice: Subject to any disclaimer, the term of this patent is extended or adjusted under 35 U.S.C. 154(b) by 0 days.

(21) Appl. No.: 09/601,000

(22) PCT Filed: Jan. 8, 1999

(86) PCT No.: PCT/FR99/00025

§ 371 (c)(1),
(2), (4) Date: Dec. 6, 2000

(87) PCT Pub. No.: WO99/39228

PCT Pub. Date: Aug. 5, 1999

(30) Foreign Application Priority Data

Jan. 28, 1998 (FR) .......................................... 98 00916

(51) Int. Cl.⁷ ................................................. G02B 6/38
(52) U.S. Cl. ............................. 385/60; 385/76; 385/78; 385/134
(58) Field of Search ........................ 385/70, 72, 76–80, 385/134, 147, 55

(56) References Cited

U.S. PATENT DOCUMENTS

| | | | |
|---|---|---|---|
| 3,197,849 A | * | 8/1965 | Johnson ........................ 29/747 |
| 4,208,092 A | | 6/1980 | Monaghan et al. |
| 4,373,777 A | * | 2/1983 | Borsuk et al. ............. 358/76 X |
| 4,752,111 A | * | 6/1988 | Fisher ......................... 385/55 |
| 4,787,701 A | * | 11/1988 | Stenger et al. ................ 385/76 |
| 5,230,032 A | * | 7/1993 | Muzslay ....................... 385/66 |
| 5,581,645 A | * | 12/1996 | Gehri ........................... 385/78 |
| 5,608,828 A | * | 3/1997 | Coutts et al. ............. 385/72 X |

FOREIGN PATENT DOCUMENTS

| | | |
|---|---|---|
| EP | 0 305 869 A | 3/1989 |
| GB | 2 136 595 A | 9/1984 |
| JP | A-07-281056 | 10/1995 |
| WO | WO 88/07691 A | 10/1988 |

* cited by examiner

Primary Examiner—Lynn Field
Assistant Examiner—Son V. Nguyen
(74) Attorney, Agent, or Firm—Oliff & Berridge, PLC (57) ABSTRACT

A device for connecting and disconnecting two individual optical fibers comprising: two ferrules each having a front face, a connection channel in which the two ferrules can be engaged facing each other, two axial retention means to limit axial displacements of a corresponding ferrule relative to the connection channel in a direction opposite from its direction for engagement in said channel, and a resilient member urging one of the ferrules to press the front faces of the two ferrules against each other while they are interconnected. For disconnection purposes, the device includes an unlocking key suitable for disengaging the axial retention means of one of the ferrules, and the resilient member is arranged so that when the unlocking key disengages the retention means, it pushes the ferrule back towards the outside of the alignment sleeve and gives rise to disconnection.

14 Claims, 6 Drawing Sheets

DEVICE FOR INTERCONNECTING TWO OPTICAL FIBERS WITH AXIAL RETENTION MEANS AND AN UNLOCKING KEY

The present invention relates to a device for interconnecting and disconnecting two individual optical fibers, and to a spreader-connector for optical fibers.

BACKGROUND OF THE INVENTION

The spreader-connector of the present invention is a novel device enabling optical fibers that are grouped together in a ribbon or in a microsheath to be connected individually to individual optical fibers, and to do so in very little space.

Spreaders are known which enable the optical fibers of an optical fiber cable such as a ribbon or a microsheath to be separated.

They constitute guide devices of the type comprising a bundle of diverging channels, with the optical fibers penetrating into the device while grouped together in the cable, each fiber being received in a respective channel, and then the fibers leaving the spreader separated from one another.

Individual optical fiber connectors are also known comprising two connector elements for mounting at the ends of respective individual optical fibers that are to be connected together.

Such individual connectors are quite bulky in comparison with the optical fibers they connect together.

OBJECTS AND SUMMARY OF THE INVENTION

The present invention seeks to provide an individual connector that is compact and to combine these two functions of spreading and of individual connection in a single device of minimum size.

In a first aspect, the present invention provides a device for interconnecting and disconnecting two individual optical fibers, the device comprising:

two ferrules each having a front face and each being suitable for mounting at the end of a respective one of the optical fibers;

a connection channel in which the two ferrules can be engaged to face each other;

two axial retention means, each serving to limit axial displacements of a ferrule relative to the connection channel in a direction opposite to the direction for engaging it in said channel; and a resilient member urging one of the ferrules to press the front faces of the two ferrules against each other while they are interconnected;

wherein for disconnection purposes the device includes an unlocking key suitable for disengaging the axial retention means of one of the ferrules, and wherein the resilient member is arranged so that when the unlocking key has disengaged the retention means, it pushes back said ferrule towards the outside of the alignment sleeve and gives rise to disconnection.

In other words, the individual connector of the invention is original in that it does not have means for assembling together and separating two connector elements acting one on the other, unlike conventional connectors in which each connector element includes firstly a ferrule retention means that is permanently operational, and secondly a separate means for assembly with the other connector which comes into operation only for connection purposes.

The invention thus consists in using the ferrule retention means as means for assembling together and separating optical fibers, thereby eliminating any separate assembly means.

The present invention also provides a device for individually connecting and disconnecting optical fibers grouped together in an optical fiber cable such as a ribbon or a microsheath with individual optical fibers, the device comprising:

a box comprising:
  an insertion orifice for insertion of an optical fiber cable;
  at its end opposite from said insertion orifice, a plurality of connection channels opening to the outside of the box; and
  interposed between the insertion orifice and the connection channels, a spreading space enabling the fibers grouped together in the cable to spread apart from one another;

the device further comprising:
a plurality of internal ferrules each having a front face and each being suitable for being mounted on the end of a respective optical fiber spread out from the cable and for being engaged in a respective connection channel of the box from its end adjacent to the spreading space;

a plurality of external ferrules each having a front face and each being suitable for mounting on the end of a respective individual optical fiber and for being engaged in a respective connection channel from the outside of the box so as to face an internal ferrule;

in each connection channel, two axial retention means, each serving to limit axial displacements of a respective ferrule relative to the connection channel in a direction opposite from its engagement direction in said channel;

an unlocking key external to the box and suitable for disengaging the axial retention means of a single external ferrule in order to disconnect an individual optical fiber; and in each connection channel, a resilient member urging one of the ferrules in its direction for engagement into the connection channel so as to press the front faces of the two ferrules against each other while they are interconnected, said resilient member also being arranged so that when the unlocking key disengages the axial retention means of an external ferrule, it pushes said external ferrule back towards the outside of the box and gives rise to individual disconnection of the two optical fibers.

It will be understood that the device of the invention makes it possible firstly to spread the optical fibers of a ribbon or microsheath type optical fiber cable, and secondly to connect each of the spread fibers from the cable individually to a respective individual fiber.

In this device, each connection channel forms an individual connector for an optical fiber.

This device of the invention is of reduced size because each of its connection channels is fitted only with means for retaining an external ferrule, unlocking being provided by the resilient member in each connection channel and by the unlocking key external to the box, which key is used individually to release each ferrule.

Thus, by eliminating the unlocking means in each connection channel, the size of each individual connector is reduced and it is possible to arrange a plurality of such individual connectors close together within the box.

In a particular embodiment, the retention means is constituted by a shoulder and by a clip having resilient fingers that move radially.

In a variant of this embodiment, the clip is part of the connection channel and the shoulder is part of the ferrule.

In a preferred embodiment, the ferrule presents a clearance portion adjacent to its shoulder, the cross-section of the clearance portion being smaller than that of the axial passage so as to leave radial clearance between the ferrule and said passage when the ferrule is inserted in the orifice.

In a preferred embodiment of the invention, the unlocking key has an end portion in the form of a longitudinally split hollow cylinder whose cross-section lies within the radial clearance that exists between the external ferrule and the channel and which can slide axially along the external ferrule between the ferrule and the wall of the axial passage in the body so as to come and spread apart the resilient fingers of the clip, thereby releasing the external ferrule.

In a particular embodiment, between its clearance portion and its opposite end remote from the front face, the ferrule includes a radially narrow portion which is terminated towards said opposite end by an axial abutment, and the unlocking key comprises, behind its end portion in the form of a split hollow cylinder, a projection which is free from any constraint when it overlies the radially narrow portion of the ferrule, thereby enabling the unlocking key to move axially relative to the ferrule, and which is suitable for going past the axial abutment by deforming elastically under the action of axial thrust exerted by an operator.

In an advantageous variant, the radially narrow portion of the ferrule is long enough to enable the unlocking key to be outside the connection channel when projection goes past the axial abutment of the external ferrule, said external ferrule being engaged in said channel and being retained by the clip.

Thus, the projection goes past the axial abutment to snap-fasten the unlocking key on the ferule outside the connection channel, thereby enabling the key to deform elastically.

By way of example, each ferrule can be obtained by being overmolded on the end of its individual optical fiber.

Preferably, the resilient member is a coil spring which acts solely on the internal ferrules.

In a particular embodiment, the device includes an alignment sleeve in each connection channel, the sleeve being suitable for receiving the facing front faces of an internal ferrule and of an external ferrule and for putting them into alignment.

The device of the invention is very small in size. For example, it can be made using ferrules having a diameter of 1.25 mm with adjacent connection channels at 3 mm intervals.

BRIEF DESCRIPTION OF THE DRAWINGS

In order to make the invention better understood, there follows a description of embodiments given as non-limiting examples, and made with reference to the accompanying drawings, in which.

MORE DETAILED DESCRIPTION

Figure 1:
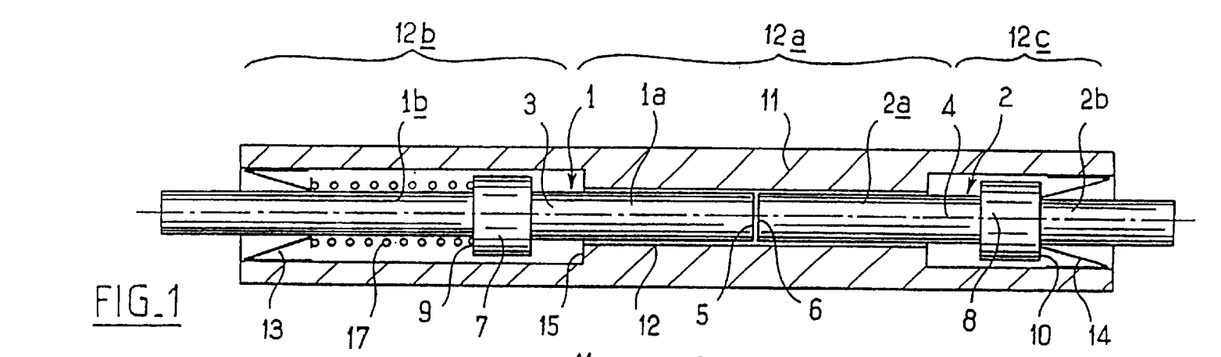
FIG. 1 is an axial section view of a connection/disconnection device constituting a first embodiment of the invention.
Figure 2:
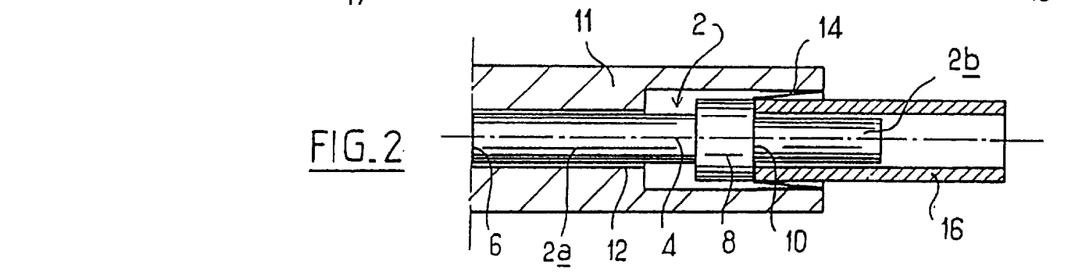
FIG. 2 corresponds to the right-hand half of FIG. 1 during separation of two fibers.
Figure 3:
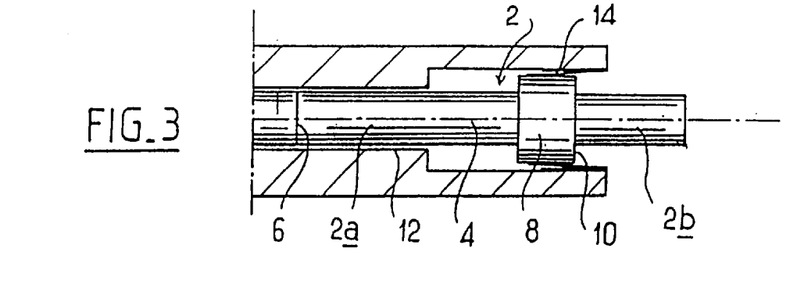
FIG. 3 is analogous to FIG. 2 and shows the device at a later stage during separation of two fibers.

The connection/disconnection device of FIGS. 1 to 3 comprises two ferrules 1, 2 each overmolded on the end of an optical fiber represented by an axis line 3, 4.

Each ferrule is in the form of a cylinder having a front face 5, 6 and a portion 7, 8 of larger diameter than the cylinder, serving in particular to define a shoulder 9, 10 facing away from the front face 5, 6, the cylinder extending on either side of its portion 7, 8 in the form of two segments 1a, 1b or 2a, 2b.

The device also comprises an elongate body 11 having a cylindrical connection channel 12 formed therein, the channel having an intermediate portion 12a of diameter that is very slightly greater than the outside diameter of the cylinder constituted by each ferrule, and two end portions 12b and 12c that open out in opposite faces 13 and 14 of the body 11 and that are of a diameter that is slightly greater than the outside diameter of the portion 7, 8 on each ferrule.

The length of the intermediate portion is considerably shorter than the sum of the lengths of the ferrule portions situated between the large diameter portions 7, 8 and the front faces 5, 6 of each fiber.

At each opening of the connection channel, in the end portions 12b and 12c, the device includes axial retention means for the corresponding ferrule, said means being constituted by a clip 13, 14 formed by a ring having resilient fingers suitable for deforming radially outwards and serving when in the rest position to reduce the diameter of free passage through the connection channel. Each clip 13, 14 is securely fixed in the corresponding end portion 12b, 12c and is directly so that its resilient fingers reduce the through diameter of the end portion adjacent to the inside of the corresponding ring.

The shoulder 10 bears against the resilient fingers of the clip 14 when the corresponding ferrule 2 is in place inside the body 11.

In the right-hand portion 12c of the connection channel, the resilient fingers and the ring are positioned in such a manner that the front face 6 of the locked ferrule is situated substantially in the middle of the intermediate portion 12a.

In the left-hand portion 12b of the connection channel, the clip 13 and the shoulder 9 are spaced far enough apart to receive a coil spring 17 interposed between the clip and the shoulder around the cylindrical segment 1a.

It will be understood that the coil spring 17 urges the ferrule 3 towards the intermediate portion 12a. In the absence of the ferrule 2, the larger diameter portion 7 of the ferrule 3 comes to bear against the wall 15.

When the ferrule 2 is present in the body 11, its front face 6 bears against the front face 5 of the ferrule 3 which is pushed back to the left in the drawing so that the two front faces lie substantially in the middle of the intermediate portion 12a.

To disconnect the ferrule 2, the device includes an unlocking key 16 which is constituted by a portion of cylindrical tube whose inside diameter is slightly greater than the diameter of the cylindrical segment 2b of the ferrule and whose outside diameter is slightly greater than the larger diameter portion 8 of the ferrule, but slightly smaller than the diameter of the right-hand portion 12c of the connection channel.

As can be seen in FIG. 2, the unlocking key is engaged in the end portion 12c of the body 11 around the ferrule 2.

To this end, the key 16 is split longitudinally so as to allow the optical fiber to pass through.

On coming into contact with the clip 13, the key 16 prevents it from acting by spreading its resilient fingers and comes to bear against the shoulder 10 of the ferrule.

Because the coil spring 17 urges the ferrule 1 to the right and because the front faces 5 and 6 of the two ferrules are pressed against each other, the action of the spring 17 causes the shoulder 10 of the ferrule to remain pressed against the key 16 while the key is moved to the right, until the ferrule 1 comes to the end of its stroke when its portion 7 comes into contact with the wall 15.

At this stage, the ferrule 2 can no longer be locked by the resilient fingers of the clip, as can be seen in FIG. 3, and it is sufficiently far out from the body 1 to be taken hold of in the hand and extracted fully from said body 1.

Figure 4:
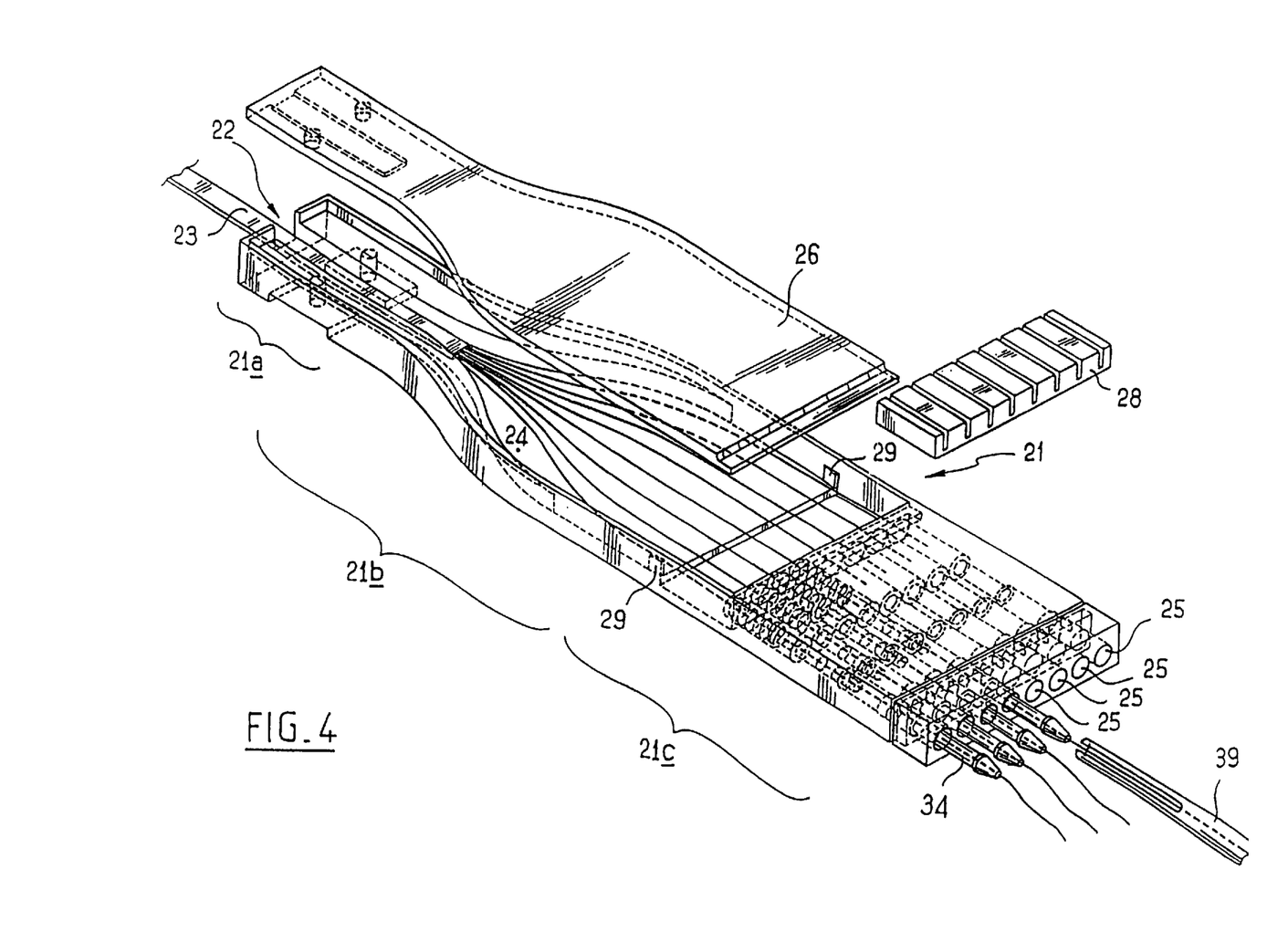
FIG. 4 is a perspective view of a device constituting a second embodiment of the invention.
Figure 5:
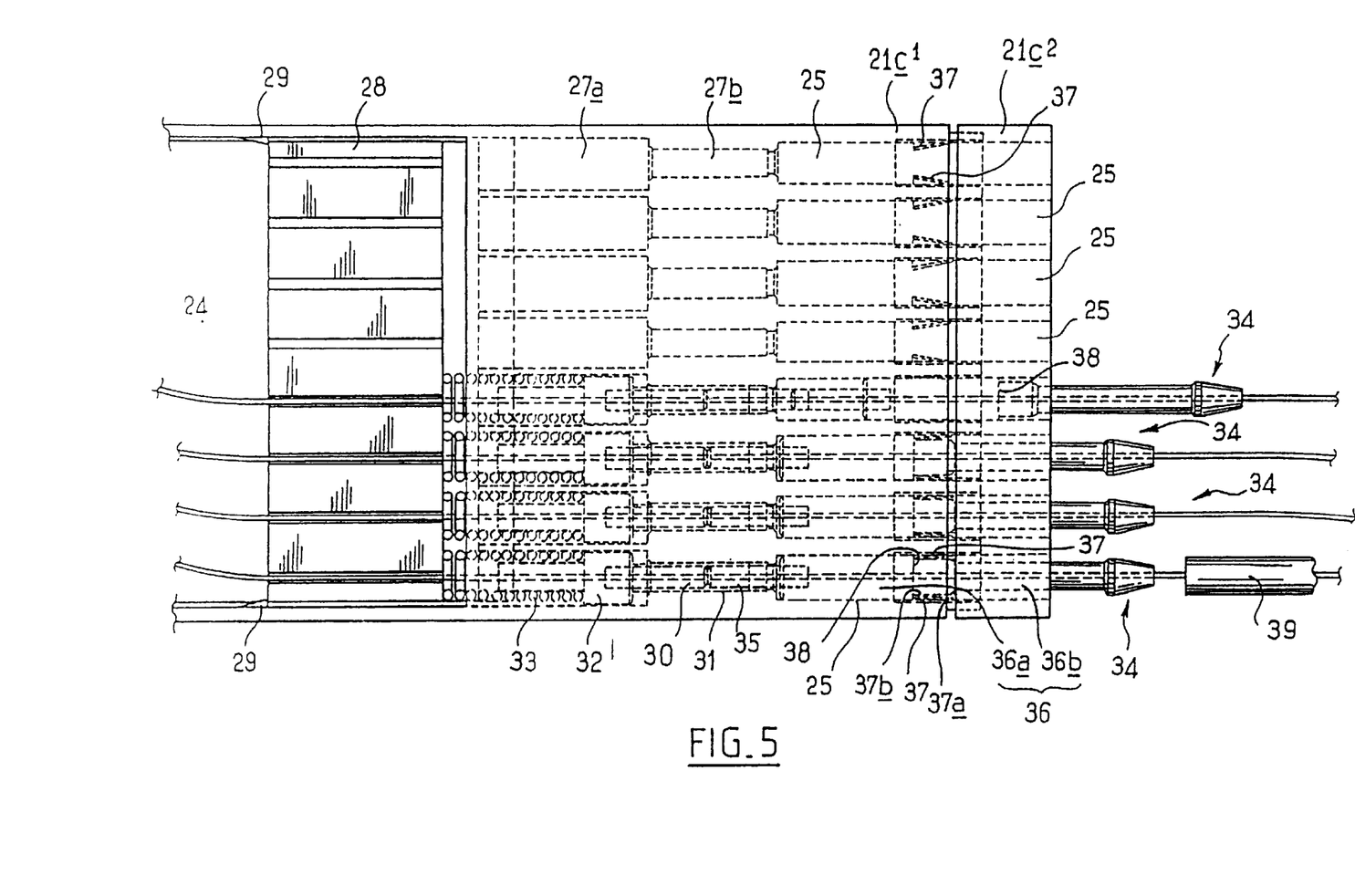
FIG. 5 is a plan view of a portion of the FIG. 4 device.
Figure 6:
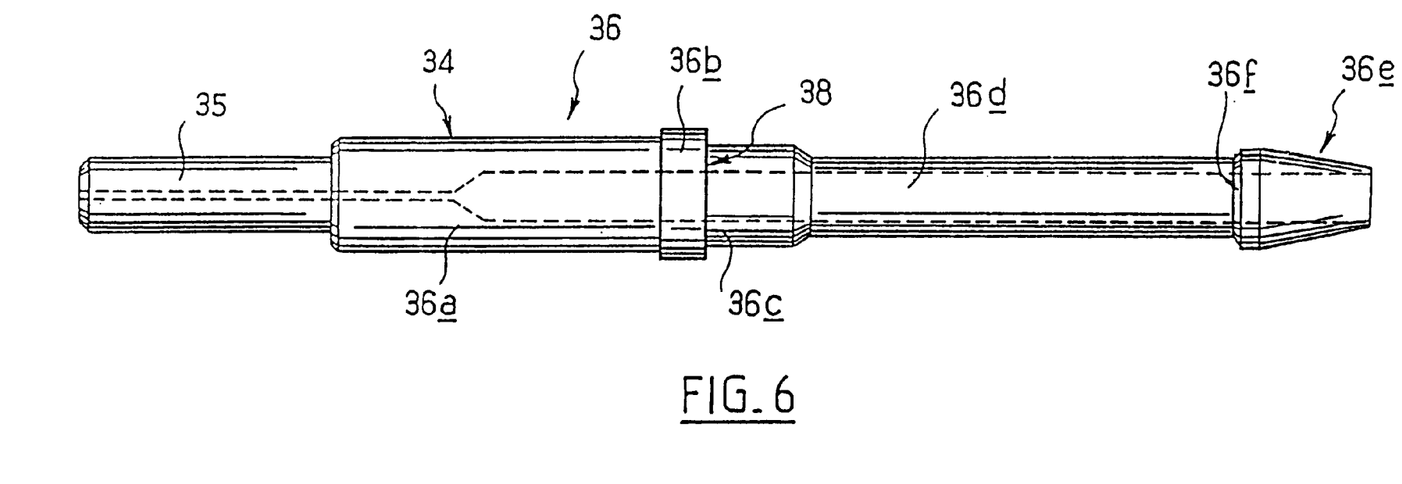
FIG. 6 is an elevation view of an external ferrule of the device of FIGS. 4 and 5.

The device of FIGS. 4, 5, and 6 comprises firstly a box 21 of plastics material comprising: a rectangular inlet portion 21a fitted with an insertion orifice 22 for an optical fiber sheath or ribbon 23; an intermediate portion 21b of width that flares away from the inlet portion and that defines an internal spreading space 24; and an outlet portion 21c which is likewise rectangular and which terminates in a front wall pierced by eight connection channels 25.

The outlet portion of the box 21 is made closed, but its inlet portion 21a and its intermediate portion 21b are made open and covered by a cover 26.

The outlet portion 21c can be seen more clearly in FIG. 5.

To clarify the drawing, FIGS. 4 and 5 show only four of the eight individual connectors that the device comprises.

In the top portion of FIG. 5, where the connectors are not shown, guides 27 are clearly visible connecting the spreading space 24 to the connection channels 25.

Each guide 27 comprises a first segment 27a opening out into the spreading space 24 and it is extended by a second segment 27b of smaller diameter than the first, opening out into the connection channel 25. The guide 27 and the connection channel 25 are cylindrical and they lie on the same axis.

A removable comb 28 having eight grooves, each lying on the axis of a respective connection channel, is put into place upstream from the guides 27 and bears against abutments 29 situated in the fiber spreading space 24.

As can be seen in the bottom portion of FIG. 5, where the connectors are shown, each spread-out fiber is fitted at its end with an internal ferrule constituted by a terminal guide 30 engaged in a sleeve 31 and by a body 32 against which a coil spring 33 bears to urge the assembly towards the connection orifice 25.

To put each internal ferrule into place, the comb 28 is removed and the ferrule, the sleeve 31, and the spring 33 are inserted in the guide 7, after which all of the springs 33 are compressed in order to position the comb 28.

The terminal guide 30 and the sleeve 31 are then positioned in the second segment 27b of the guide 27 while the body 32 and the spring 33 remain in the first segment 27a thereof.

As can be seen in FIG. 6, each external ferrule 34 mounted on an individual fiber comprises a terminal guide 35 which guides the end of the fiber, and a rigid body 36 which can be overmolded onto the fiber and onto the terminal guide.

The body 36 of the external ferrule comprises a front segment 36a, a collar 36b whose diameter corresponds substantially to the diameter of the connection channel 25, an intermediate segment 36c also referred to as a"clearance portion" which is slightly smaller in diameter than the connection channel, thereby leaving clearance between itself and the connection orifice, and a rear segment 36d, also referred to as a "radially narrow portion", and terminated by a frustoconical portion 36e forming an axial abutment 36f at its base.

At the connection between the collar 36b and the clearance portion 36c of the body 36 of each external ferrule inserted into a connection channel 25, each connection channel 25 has locking means constituted by radially resilient blades 37 extending axially within the orifice and each having a first end 37a directed towards the outside (to the right in the drawing) secured to the wall of the channel 25 and a second end 37b directed towards the inside (to the left in the drawing) closer to the axis of the channel and capable of being displaced by deforming the blade elastically so as to be moved into contact with the wall of the orifice.

To enable the resilient blades to be inserted in each of the connection channels, the outlet portion 21c of the box is made as two parts 21c1 and 21c2 which are united level with where the resilient blades 37 are received. Thus, the resilient blades 37 can be put into position while the two parts 21c1 and 21c2 of the box are separate, and then the two parts can be united, e.g. with adhesive, so as to hold the resilient blades 37 captive in each of the connection channels 25.

When an external ferrule 34 is put into place in a connection channel 25, the second end 37b of each blade comes to bear against a shoulder 38 that is the result of the difference in diameter between the collar 36b and the clearance portion 36c.

It can be seen that the locking means are particularly compact, thereby enabling the connection channels 25 to be placed very close to one another.

Figure 7:
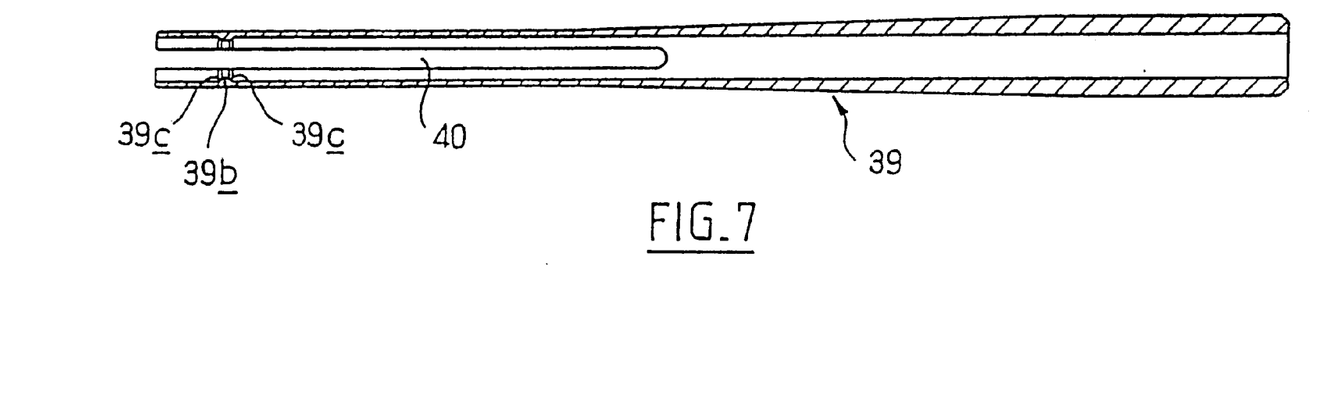
FIG. 7 is an axial section view of the unlocking key of the same device.

An unlocking key 39 external to the box is shown in FIG. 7 and comprises a tube having a split cylindrical end portion 39a of inside diameter that is very slightly greater than the diameter of the clearance portion 36c of the body of each external ferrule, and of outside diameter that is very slightly smaller than the diameter of each connection channel 25.

Thus, the cross-section of the end portion of the key lies in the clearance that exists between the cross-section of the connection channel 25 and the clearance portion 36c of the body of the external spread 34. In other words, the thickness of the end portion 39a of the unlocking key 39 is substantially equal to the difference in thickness between the collar 36b and the clearance portion 36c of the ferrule.

Behind its end portion 39a, the unlocking key 39 has an annular ridge 39b projecting from its inside face, the diameter of the ridge is smaller than that of the axial abutment 36f formed by the base of the frustoconical portion 36e of the ferrule.

The ridge 39b has two side chamfers 39c which enable said ridge to go past the axial abutment 36f when the unlocking key 39 is subjected to axial thrust exerted by an operator.

Thus, the ridge 39b and the axial abutment 36f constitute means that co-operate to enable the unlocking key 39 to snap-fasten onto the external ferrule 34.

In order to enable its front portion to have the necessary resilience while its rear portion is sufficiently rigid, the unlocking key is frustoconical in outside shape.

As can be seen in particular in FIGS. 8 to 11, the radially narrow portion 36d of the external ferrule has a diameter that is much smaller than that of the annular ridge 39b of the unlocking key, thereby enabling the key to slide freely along the ferrule without entraining it.

Figure 8:
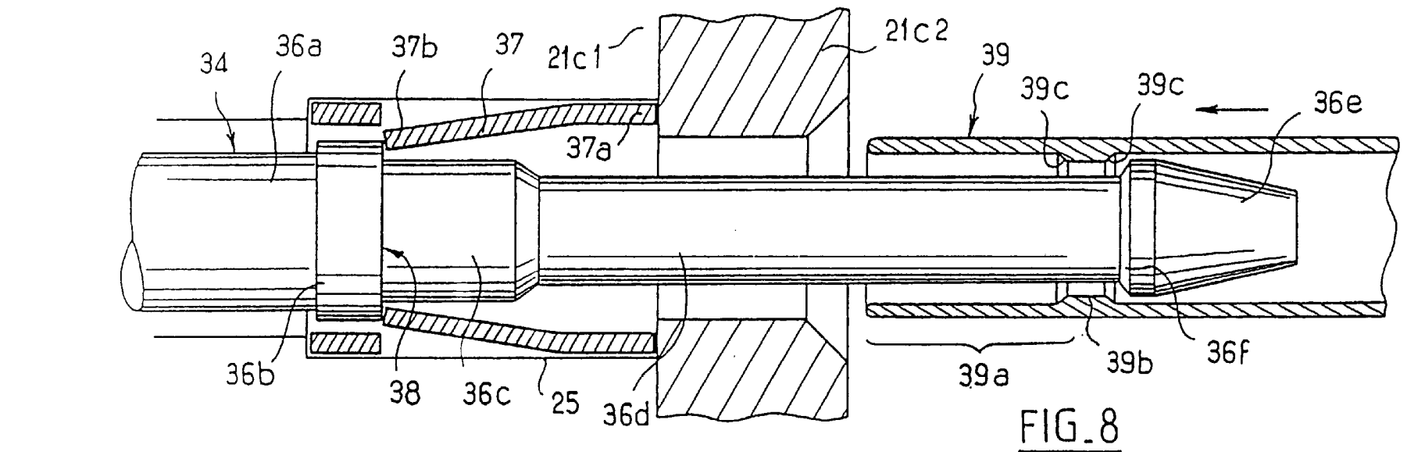
FIGS. 8 to 11 are detail section views of an external ferrule while it is being disconnected with the help of the unlocking key.
Figure 9:
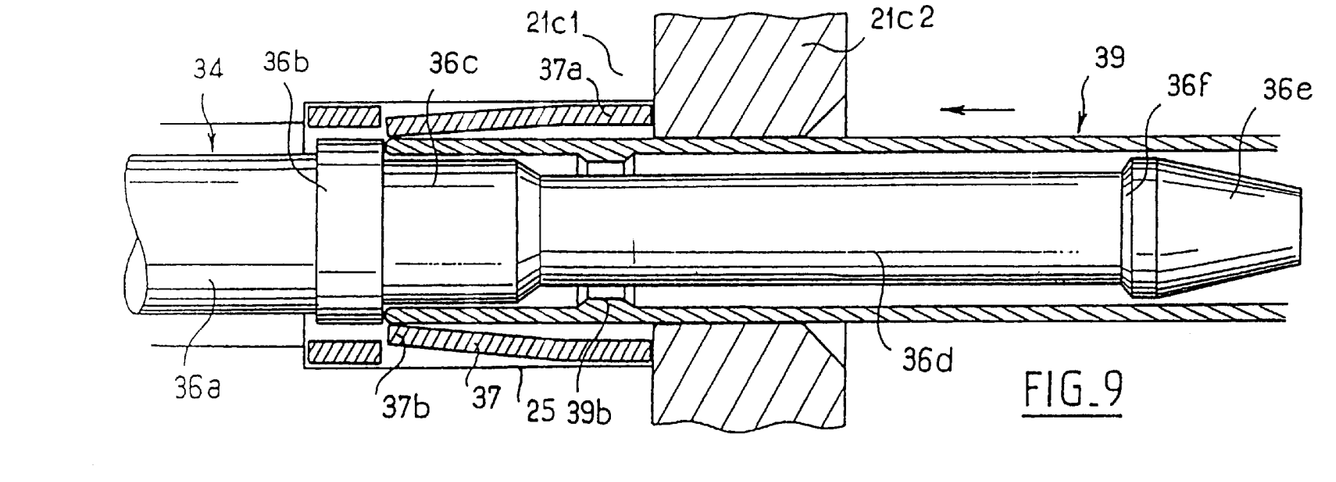

As a result, once snap-fastening has been achieved, as shown in FIG. 8, the unlocking key can continue to move towards the connection channel as shown in FIG. 9 without acting on the ferrule.

To this end, the unlocking key is hollow over a length that is at least as long as that portion of the ferrule which extends between its shoulder 38 and its end opposite from its front face.

In the example shown, the unlocking key is in fact hollow over its entire length.

The longitudinal slot 40 provided in the unlocking key 39 enables the rear portion of the key to be engaged around an individual optical fiber, as shown in FIG. 5, so that it can subsequently slide along the optical fiber until it covers the body of the external ferrule mounted at the end of said optical fiber.

The various stages of disconnection are shown in FIGS. 8 to 11.

After the key 39 has been snap-fastened onto the ferrule as explained above with reference to FIG. 8, the key is pushed in fully until it comes into abutment against the bearing surface 38 of the ferrule, as shown in FIG. 9. In so doing it pushes back the second ends 37b of the resilient blades 37, thereby releasing the ferrule which is pushed out from the channel by the springs 33, as explained with reference to FIGS. 1 to 3.

Figure 10:
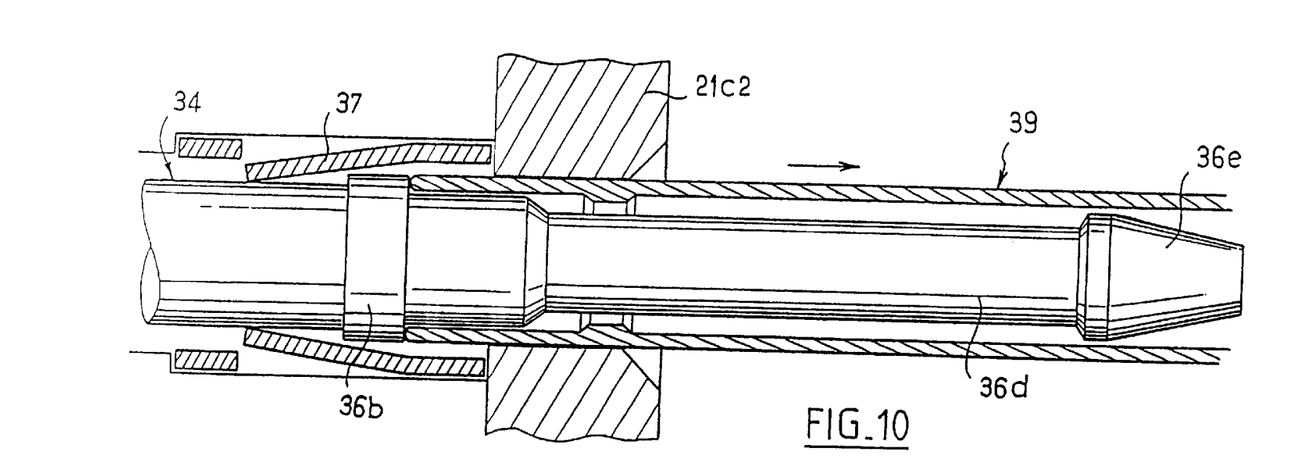
Figure 11:
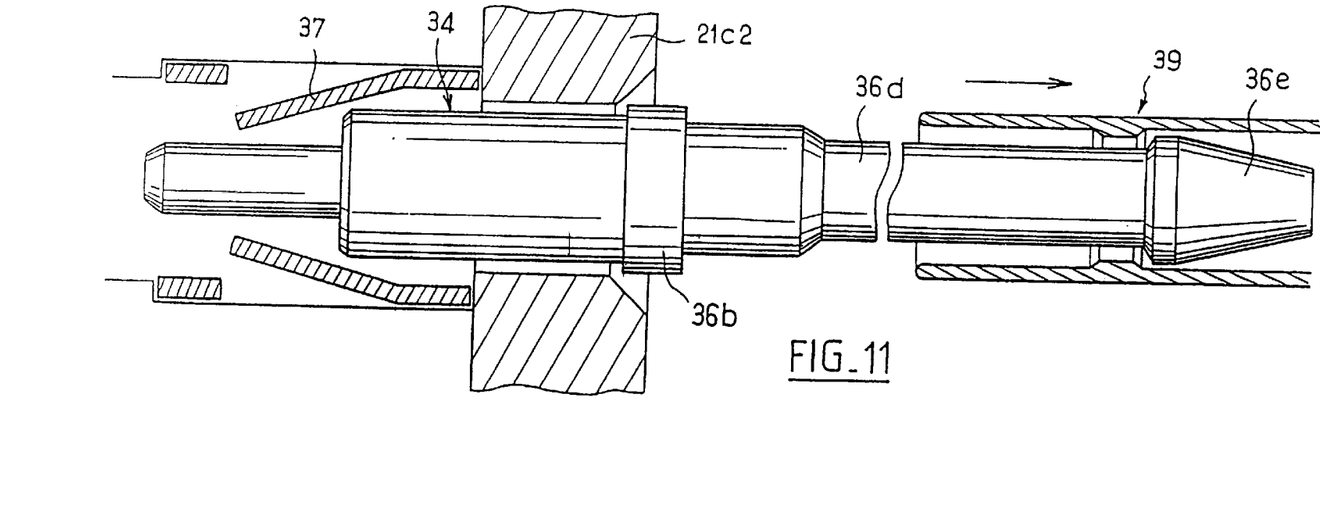

To extract the ferrule completely, it is possible either to pull the ferrule directly, or else to use the unlocking key as shown in FIGS. 10 and 11.

Once the spring 33 has expelled the external ferrule almost completely from the connection channel, the external ferrule ceases to move outwards.

If the operator continues to pull the unlocking key, the internal ridge 39b of the key comes into contact with the axial abutment 36f of the ferrule, thereby entraining the ferrule outwards until it has been fully extracted from the connection channel.

Once extracted, the external ferrule remains snap-fastened to the unlocking key.

To separate the external ferrule from the unlocking key, the operator applies traction to both of them so as to cause them to snap apart.

The key can thus be used not only to disengage the resilient blades, but also to handle the ferrules while they are being withdrawn, which is advantageous given their very small size.

Naturally, the embodiment described above is not limiting in any way and could receive any desirable modifications without thereby going beyond the ambit of the invention.

What is claimed is:

1. A device for interconnecting and disconnecting two individual optical fibers, each optical fiber having an end, the device comprising:

two ferrules, each having a front face and each being suitable for mounting at the end of a respective one of the optical fibers;

an elongate body forming a connection channel in which the two ferrules can be engaged so that the respective front faces of the ferrules face each other;

two axial retention elements each for limiting axial displacements of a respective ferrule relative to the connection channel in order to prevent disengaging of the ferrule;

a resilient member urging one of the ferrules to press the front faces of the two ferrules against each other while they are interconnected; and an unlocking key suitable for disengaging the axial retention element of one of the ferrules, the resilient member being configured so that, when the unlocking key has disengaged the retention element, said resilient member pushes back the ferrule outside said elongate body in order to disconnect the ferrule therefrom.

2. A device according to claim 1, wherein the retention element comprises a shoulder and a clip having resilient fingers that move radially.

3. A device according to claim 2, wherein the clip is secured to the connection channel and the shoulder is part of the ferrule.

4. A device according to claim 3, wherein the ferrule has a clearance portion adjacent to said shoulder, the cross-section of the clearance portion being smaller than that of the axial channel so as to leave clearance between the ferrule and said channel when the ferrule is inserted in the channel.

5. A device according to claim 4, wherein the unlocking key has an end portion in the form of a longitudinally split hollow cylinder whose cross-section lies within the radial clearance that exists between the ferrule and the channel and which can slide axially along the ferrule between the ferrule and a wall of the axial passage in the body so as to come and spread apart the resilient fingers of the clip, thereby releasing the ferrule.

6. A device according to claim 5, wherein the ferrule comprises a body overmolded on an end of the individual optical fiber.

7. A device according to claim 4, wherein, between said clearance portion and an opposite end of the ferrule remote from the front face, the ferrule includes a radially narrow portion which is terminated towards said opposite end by an axial abutment, and wherein the unlocking key comprises an end portion in the form of a split hollow cylinder, and, behind said end portion, a projection which is free from any constraint when overlying the radially narrow portion of the ferrule, thereby enabling the unlocking key to move axially relative to the ferrule, said projection being suitable for going past the axial abutment by deforming elastically under the action of axial thrust exerted by an operator.

8. A device according to claim 7, wherein the radially narrow portion of the ferrule is long enough to enable the unlocking key to be outside the connection channel when said projection goes past the axial abutment of the ferrule.

9. A device according to claim 1, wherein the resilient member is a coil spring.

10. A device for individually connecting and disconnecting optical fibers grouped together in an optical fiber cable, comprising:

a box comprising:
at a first end, an insertion orifice for insertion of an optical fiber cable;
at a second end opposite to the first end, a plurality of connection channels opening to the outside of the box;
a spreading space interposed between the insertion orifice and the connection channels enabling the fibers grouped together in the cable to spread apart from one another;

a plurality of internal ferrules, each having a front face and each being suitable for being mounted on an end of a respective optical fiber spread out from the cable and for being engaged in a respective connection channel of the box from an end adjacent to the spreading space;

a plurality of external ferrules each having a front face and each being suitable for mounting on an end of a respective individual optical fiber and for being engaged in a respective connection channel from the outside of the box so as to face an internal ferrule;

in each connection channel, two axial retention elements, each limiting axial displacements of a respective ferrule relative to the connection channel in order to prevent disengaging of said ferrule;

an unlocking key external to the box and suitable for disengaging the axial retention element of a single external ferrule in order to disconnect an individual optical fiber; and in each connection channel, a resilient member urging one of the ferrules to press the front faces of the two ferrules against each other while they are interconnected, said resilient member also being arranged so that when the unlocking key disengages the axial retention element of an external ferrule, the resilient member pushes said external ferrule back outside the box and enables individual disconnection of the two optical fibers.

11. A device according to claim 10, wherein the resilient member is a coil spring and wherein the coil spring acts solely on the internal ferrules.

12. A device according to claim 11, including an alignment sleeve in each connection channel, the sleeve being suitable for receiving the facing front faces of an internal ferrule and of an external ferrule and for putting them into alignment.

13. A device according to claim 12, including a removable comb having grooves, each lying on the axis of a respective connection channel, said comb being put into place upstream from segments of small diameter of the guides and bearing against abutments in such a manner as to compress the resilient members pushing the internal ferrules against the external ferrules.

14. A device according to claim 10, wherein the optical fiber cable is at least one of a ribbon and a microsheath with individual optical fibers.

\* \* \* \* \*